United States Patent
Kanaka et al.

(10) Patent No.: US 6,716,367 B2
(45) Date of Patent: Apr. 6, 2004

(54) PROCESS FOR PRODUCING LIQUID CRYSTALLINE POLYMER

(75) Inventors: Keiichi Kanaka, Shizuoka (JP); Katsutoshi Sakamoto, Shizuoka (JP)

(73) Assignee: Polyplastics Co., Ltd., Tokyo (JP)

( * ) Notice: Subject to any disclaimer, the term of this patent is extended or adjusted under 35 U.S.C. 154(b) by 0 days.

(21) Appl. No.: 10/316,847

(22) Filed: Dec. 12, 2002

(65) Prior Publication Data

US 2003/0127628 A1 Jul. 10, 2003

(30) Foreign Application Priority Data

Dec. 18, 2001 (JP) ........................................ 2001-384459

(51) Int. Cl.$^7$ ........................ C09K 19/52; C08G 63/00
(52) U.S. Cl. ................. 252/299.01; 528/181; 528/176; 528/190; 524/777; 524/785
(58) Field of Search ................................ 528/176, 181, 528/190, 193, 194, 206, 212, 218, 219, 275, 280; 524/777, 785; 252/299.01, 299.6, 299.62, 299.63, 299.64, 299.67

(56) References Cited

U.S. PATENT DOCUMENTS

| 3,528,946 A | 9/1970 | Stewart et al. |
| 5,155,204 A | 10/1992 | Parodi et al. |
| 6,114,492 A * | 9/2000 | Linstid, III et al. ......... 528/181 |

FOREIGN PATENT DOCUMENTS

| EP | 0 410 222 | 1/1991 |
| JP | 63-284221 A | 11/1988 |
| JP | 64-33123 A | 2/1989 |
| JP | 2002-179776 A | 9/2001 |

* cited by examiner

Primary Examiner—Mark F. Huff
Assistant Examiner—Jennifer R. Sadula
(74) Attorney, Agent, or Firm—Burns, Doane, Swecker & Mathis, L.L.P.

(57) ABSTRACT

A process for producing a liquid crystalline polymer with increased polymerization rate and reduced deposition of monomer-derived substances to the reaction vessel during production is provided. A liquid crystalline polymer having a constituent unit derived from 4-hydroxybenzoic acid in an amount 8 mol % or less is produced by conducting reaction at the presence of a catalytic amount of a catalyst comprising a potassium compound and a trivalent cobalt compound in combination.

12 Claims, No Drawings

PROCESS FOR PRODUCING LIQUID CRYSTALLINE POLYMER

This application claims priority under 35 U.S.C. §§ 119 and/or 365 to Application No. 2001-384459 filed in Japan on Dec. 18, 2001; the entire content of which is hereby incorporated by reference.

TECHNICAL FIELD OF THE INVENTION

The present invention concerns a process for producing a liquid crystalline polymer. More specifically, it relates to a process for producing a liquid crystalline polymer with increased polymerization rate and reduced deposition of monomer-derived substances to a reaction vessel during production by the use of specified metal compound catalysts in combination.

PRIOR ART

As the liquid crystalline polymer, wholly aromatic liquid crystalline polyesters and wholly aromatic liquid crystalline polyester amides are generally known. They are produced, for example, by polycondensation of monomers selected from aromatic hydroxy dicarboxylic acids, aromatic diols, aromatic dicarboxylic acids, aromatic hydroxy amines, aromatic amino carboxylic acids or aromatic diamines.

Bonds of aromatic moiety in the polymer are mainly ester bonds between aromatic carboxyl groups and phenolic hydroxy groups but it is usually difficult to form the ester bonds by direct dehydrating condensation between the carboxylic group and the phenolic hydroxyl group. In view of the above, a method of using an aromatic compound prepared by previously acylating a phenolic hydroxyl group with an acylating agent such as an aliphatic carboxylic acid anhydride like acetic anhydride, for example, 4-acetoxy benzoic acid as a starting material and conducting ester exchange between the obtained compound and the aromatic carboxylic acid thereby producing a polyester while distillating to remove by-produced aliphatic carboxylic acid has been adopted (JP-A 64-33123 and JP-A 63-284221). However, in view of economy, it is desirable to produce by acylation-deacylation in one pot (one step method of starting reaction by charging into an identical reaction vessel).

While the acylation by the aliphatic acid anhydride and the ester exchange reaction between the acylating agent and the carboxylic acid proceeds even under the absence of a catalyst, the reaction can be promoted by use of a catalyst, for which alkali metal carboxylate are generally used. Needless to say, carboxylates of alkali metals are excellent as the acylation catalyst, it is necessary to use the aliphatic acid anhydride in excess for 100% acylation of hydroxyl groups in which discoloration of the polymer or remarkable viscosity increase due to side reaction occurs. Accordingly, when the polymer quality or the productivity is taken into consideration, it is inevitable to transfer to a polycondensation reaction in a state where the acylating reaction rate is somewhat lower than 100%.

The main component of the liquid crystalline polymer often used so far for highly heat resistant and high strength materials is 4-hydroxy benzoic acid. Since this monomer is modified into phenol by decarbonation reaction under the presence of an alkali metal salt and also functions as a splitting group during polymerization, it has a merit capable of compensating the insufficiency of the acylating reaction rate even when it does not reach 100%.

On the other hand, since a homopolymer of 4-hydroxy benzoic acid has a melting point higher than the decomposition point, it is necessary to lower the melting point by copolymerizing various component. Those copolymers with various kinds of comonomers have been proposed but they include a problem such as lowering of heat resistance along with lowering of the melting point. That is, the relation between heat resistance and moldability such as injection or extrusion is antinomy. Accordingly, a polymer of higher heat resistance requires higher temperature for molding fabrication, and there are problems such as violent degradation by decomposition of polymer during molding, swelling of molding articles by polymer decomposition gas (blister deformation), worsening of hue in the molding products (formation of stripe pattern) and easy corrosion of a molding machine due to generated gaseous ingredients. It is shown in JP-A 2002-179776 that a liquid crystalline polyester comprising a 2-hydroxy-6-naphthoic acid unit (8.5 to 30 mol %) and a 4-hydroxy benzoic acid unit (0.1 to 8 mol %) in combination which solved the problems.

By the way, as a result of a further study, it has been found that the function and effect by 4-hydroxy benzoic acid as described above can not be obtained in a case of a polymer at a lower ratio of (or not containing) 4-hydroxy benzoic acid unit and, accordingly, the rate of progress of the acylating reaction gives a significant effect particularly on the subsequent polymerization rate. Namely, in a case of a polymer at a lower ratio of (or not containing) the 4-hydroxy benzoic acid unit, progress of the polycondensation reaction is extremely slow compared with the existent polymer comprising 4-hydroxy benzoic acid as the main component even when an alkali metal catalyst is used and, when it reaches a stage where deacylation proceeds no more, the reaction by monomer elimination proceeds inevitably, to cause remarkable sublimation and deposition of eliminated monomers to the reaction vessel. Because the reaction proceeds with removal of monomers.

DISCLOSURE OF THE INVENTION

The present invention intends to solve the problem upon producing a liquid crystalline polymer at a lower ratio of (or not containing) the 4-hydroxy benzoic acid unit. As a result of the earnest study by the present inventors, it has been found that the use of a specified catalyst is effective for attaining the foregoing object, to accomplish the present invention.

The invention provides a process for producing a liquid crystalline polymer including a constituent unit derived from 4-hydroxy-benzoic acid in an amount of 8 mol % or less, comprising polymerizing monomers in the presence of a catalytic amount of a catalyst comprising a potassium compound and a trivalent cobalt compound in combination.

That is, the invention provides a process for producing a liquid crystalline polymer having a ratio of a constituent unit derived from 4-hydroxy-benzoic acid of 8 mol % or less, in which reaction is conducted in the presence of a catalytic amount of a catalyst system comprising a potassium compound catalyst and a trivalent cobalt compound catalyst in combination.

The obtained liquid crystalline polymer preferably contains constituent units represented by the following formulae (I), (II), (III) and (IV), in which the amount of the constituent unit (I) is 40 to 75 mol %; that of (II), 8.5 to 30 mol %; that of (III), 8.5 to 30 mol %; and that of (IV), 0.1 to 8 mol % based on the entire constituent units:

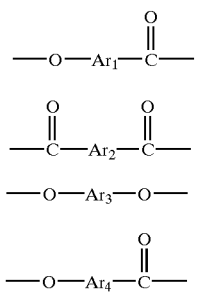

(where Ar$_1$ represents 2,6-naphthalene, Ar$_2$ represents at least one selected from the group consisting of 1,2-phenylene, 1,3-phenylene and 1,4-phenylene, Ar$_3$ represents at least residue selected from the group consisting of 1,3-phenylene, 1,4-phenylene or a residue of compounds including two or more phenylene groups connected with each other at para-positions and Ar$_4$ represents 1,4-phenylene).

The process of the invention may further comprising a solid phase polymerization step to increase a polymerization degree of a prepolymer obtained by the melt polycondensation.

DETAILED DESCRIPTION OF THE INVENTION

This invention is to be described specifically. The liquid crystalline polymer as an object for production in this invention has a ratio of the constituent unit derived from 4-hydroxy benzoic acid of 8 mol % or less. There is no particular restriction on other constituent units so long as the liquid crystallinity is exhibited and the polymer is produced, for example, by polycondensation of monomers selected from known aromatic hydroxy dicarboxylic acids, aromatic diols, aromatic dicarboxylic acids, aromatic hydroxy amines, aromatic amino carboxylic acids and aromatic diamines. Particularly preferred is a liquid crystalline polymer containing constituent units represented by the following general formulae (I), (II), (III), and (IV) as an essential constituent ingredients, in which the heat resistance and melt-moldability are compatible with each other:

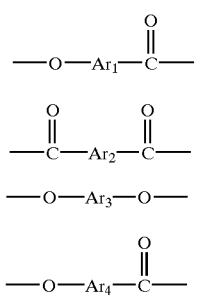

(in which Ar$_1$ represents 2,6-naphthalene, Ar$_2$ represents at least one selected from the group consisting of 1,2-phenylene, 1,3-phenylene and 1,4-phenylene, Ar$_3$ represents at least residue selected from the group consisting of 1,3-phenylene, 1,4-phenylene or a residue of compounds including two or more phenylene groups connected with each other at para-positions and Ar$_4$ represents 1,4-phenylene.).

For embodying the constituent units (I)–(IV) described above, various usual compounds having ester forming ability are used.

Specifically, the constituent unit (I) is derived from 2-hydroxy-6-naphthoic acid.

The constituent unit (II) is a dicarboxylic acid unit in which Ar$_2$ is selected from 1,2-phenylene, 1,3-phenylene and 1,4-phenylene and, preferably, it is derived from terephthalic acid in view of the heat resistance.

The constituent unit (III) is a diol unit for which hydroquinone, dihydroxybiphenyl, etc. are used as the starting compound, with dihydroxybiphenyl, particularly, 4,4'-dihydroxybiphenyl being preferred in view of the heat resistance.

Further, the constituent unit (IV) is derived from 4-hydroxy benzoic acid.

In this invention, it is preferred that the constituent units (I) to (IV) are contained and the constituent unit (I) ranges from 40 to 75 mol % (preferably, 40 to 60 mol % and, more preferably, 45 to 60 mol %), the constituent unit (II) ranges from 8.5 to 30 mol % (preferably, 17.5 to 30 mol %), the constituent unit (III) ranges from 8.5 to 30 mol % (preferably, 17.5 to 30 mol %) and the constitution unit (IV) ranges from 0.1 to 8 mol % (preferably, 1 to 6 mol %) based on the entire constituent units.

Further, in addition to the constituent units described above, a hydroxyamine unit represented by the following formula may be contained by 30 mol % or less as the constituent unit (V). The constituent unit is derived from 4-aminophenol, 3-aminophenol, an ester (amide) forming derivative of each of them.

(in which Ar$_5$ is at least one selected from the group consisting of 1,3-phenylene and 1,4-phenylene).

The liquid crystalline polymer according to this invention is produced by polymerizing the starting monomer described above under the presence of an acylating agent using the catalyst described above.

The acylating agent used in this invention includes aliphatic or aromatic carboxylic acid anhydrides, preferably, lower aliphatic carboxylic acid anhydrides with 10 or less carbon atoms such as acetic acid anhydride and propionic acid anhydride, particularly preferably, acetic acid anhydride. For completing the reaction reliably, the acylating agent is desirably used in an excess amount to the amount of the functional group to be acetylated. Since the presence of an excess acylating agent may possibly results in discoloration of the polymer or remarkable increase in the viscosity by the side reaction as described above, it is desirably used by 1 to 8 mol % excess based on the entire mol number of the functional groups to be acetylated.

The potassium compound catalyst used in this invention can include carboxylates (a carboxylic acid salt), oxides, hydroxides and chlorides of potassium. It is preferably aliphatic and/or aromatic carboxylates of potassium and, more preferably, potassium acetate. The potassium compound catalyst is generally used in an amount of 2 to 200 ppm, preferably, 10 to 150 ppm weight % of metal per theoretical amount of the polymer.

The cobalt compound catalyst used in this invention can include carboxylates, oxides, hydroxides, carbonates and complex salts of cobalt compounds, as well as mixtures thereof and it is essential that the compound is a trivalent cobalt compound. When monovalent or bivalent cobalt compound is used, while improvement can be obtained in view of the acylating efficiency, polycondensation reactivity and sublimation and deposition of monomers compared with a case of using the potassium compound catalyst alone, it is not yet at a insufficient level. This difference is further amplified, particularly, in a case of repeating continuous batchwise polymerization with no cleaning.

The trivalent cobalt compound is, preferably, cobalt (III) tris(2,4-pentanedionate). The cobalt compound catalyst is generally used in an amount of 2 to 200 ppm, preferably, 10 to 50 ppm by weight % of metal per theoretical amount of the polymer.

The entire amount of the catalyst for the potassium compound catalyst and the cobalt compound catalyst in combination is within a range from 5 to 400 ppm, preferably, 20 to 200 ppm and, particularly, preferably, 25 to 90 ppm by weight % of metal per theoretical amount of the polymer. Since an excessive amount promotes side reactions or rather increases sublimation products, it is desirably used in a practically minimum amount. The ratio of the potassium compound catalyst to the cobalt compound catalyst is: K/Co=1/2 to 8/1, preferably, K/Co=1/1 to 5/1 by weight ratio of metal in view of the reaction rate and the amount of sublimation products.

Upon practicing the invention, it is general to charge the starting monomer, the acylating agent and the catalyst all at once to the reactor in the polymerization reaction. In this case, an acylated monomer may be previously contained partially. The charged starting monomer is acylated in the system under heating and polycondensation proceeds while separating by-produced organic acids and further taking place ester exchange between the acylated reaction product and the carboxylic acid, and the reaction is kept till the aimed polymer viscosity is reached. In this case, the acylation reaction and the polycondensation reaction may be conducted in one single reaction vessel, or they may be conducted separately by an acylating reactor and a polycondensating reactor.

The acylation proceeds in a temperature range from 100 to 200° C. In a case of acylation with acetic acid anhydride which is used particularly preferably, it is desirable to apply reflux for avoiding the loss of acetic acid by distillation.

The polycondensation reaction of the acylation product proceeds at 210° C. or higher. Along with increase of the reaction temperature, by-produced organic acids are removed, the polymerization degree increases gradually and, finally, the product is heated to about 300–400° C. While the final polymerization temperature is different depending on polymers, it is preferred to set the temperature higher by 0 to 50° C. than the melting point of the resultant polymer. As it approaches the final polymerization temperature, highly boiling evaporative ingredients, for example, phenol or monomer ingredient evaporate in addition to the organic acids and the molecular weight is increased more and more. Finally, inside of the system is depressurized and the evaporative ingredients are removed to further increase the molecular weight and suppress blowing of evaporative gases upon discharge. For the depressurization treatment, a depressurization degree within a range of atmospheric pressure or less and 133 Pa or more is adopted.

After polymerization, a molten polymer is discharged through an extrusion orifice having a die of an optional shape out of a reactor and then cooled and collected. Generally, the molten product is discharged through a die with holes to form a strand which is taken into a water bath, pelletted and dried.

It is preferred that the liquid crystalline polymer produced by the process according to this invention preferably has a melting viscosity of 100,000 Pa·s or less and, further preferably, 1,000 Pa·s or less at a temperature higher by 10 to 30° C. than the melting point and at a shearing rate of 1,000/sec. While the melting viscosity of such a level can be attained sufficiently only by melt polymerization, a prepolymer at about several Pa·s may be prepared in the stage of melt polymerization depending on the case and the prepolymer is polymerized in a solid phase at a temperature lower than the melting point thereof, preferably, at a temperature lower by 20 to 80° C. than the melting point to increase the molecular weight. Such solid phase polymerization can be conducted by any of batchwise, semi-batchwise or continuous system and the reaction is preferably conducted under a reduced pressure or under flow of an inert gas such as nitrogen.

In the process for producing the liquid crystalline polymer according to this invention, it is possible for polymerization with addition of a stabilizer, a colorant, a filler or the like as in the prior art within the range not hindering or lowering the effect of the invention. The filler described above can include, for example, silica, powdered quartz, sand, fumed silica, silicon carbide, aluminum oxide, glass fiber and mixtures thereof.

The melting anisotropy of the liquid crystalline polymer obtained according to this invention can be confirmed by an ordinary polarization inspection method of utilizing cross polarizers. More specifically, the melting anisotropy can be confirmed by melting a specimen placed on a hot stage manufactured by Lincam, using a polarization microscope manufactured by Olympus and observing it under a magnification ratio of 150× in a nitrogen atmosphere. The polymer is optically isomeric and transmits light when inserted between cross polarizers. When the specimen is optically isomeric, polarized light transmits, for example, even in a molten stationary liquid state.

The liquid crystalline polymer obtained according to this invention can be blended with various kinds of additives in accordance with the purpose of use such as various kinds of fibrous, particulate or plate-like organic or inorganic fillers and antioxidants. Further, other thermoplastic resins may be added auxiliarily to form a resin composition within a range not deteriorating the purpose intended in this invention.

EXAMPLE

This invention is to be described more in details with reference to examples but the invention is not restricted to them. The method of measuring the physical properties for examples is as shown below.

[Acetylation Rate]

The ratio of acetylated hydroxyl groups was determined as an area ratio using a nuclear magnetic resonance apparatus (AS400 manufactured by Bluca Co.)

[Melting Point]

By using a differential scanning calorimeter (DSC7, manufactured by Perkin-Elmer, Inc.), the temperature of a polymer specimen in an amount of about 10 mg was elevated at a rate of 20° C./min from 50° C. to 450° C. and then the temperature was lowered at 20° C./min down to 50° C., and then the temperature was increased again at 20° C./min up to 450° C. to measure the endothermic thermogram. The melting point (° C.) was determined from the value for the endothermic peak at the second time.

[Deposition State of Sublimation Product]

Sublimation products deposited to a lower portion of a column after polymerization was visually evaluated by the following three stages.

A: State deposited thinly on the wall surface of column
B: State in which about 20 to 80% of the column flow channel was closed by deposited sublimation products.
C: State in which about 80% or more of the column flow channel was closed by deposited sublimation products.

[Melting Viscosity]

Using a melting viscosity measuring apparatus (Capillograph 1B, manufactured by Toyo Seiki Seisaku-sho, Ltd.), the melting viscosity was measured under the temperature condition of the polymer melting point+10 to 30° C. at a sharing rate of 1,000/sec in a 1 mmφ×20 mm capillary.

Example 1

To a polymerization vessel equipped with a stirrer having a torque meter, a refluxing column, a nitrogen introduction tube and a condenser, were charged 166.09 g of 2-hydroxy-6-naphthoic acid, 5.08 g of 4-hydroxy benzoic acid, 76.37 g of terephthalic acid, 85.59 g of 4,4'-dihydroxybiphenyl, 195.22 g (1.04 times the hydroxy group equivalent) of acetic acid anhydride, and 45.0 mg of potassium acetate (60 ppm by weight of metallic potassium based on the resultant resin) and 45.0 mg of cobalt (III) tris(2,4-pentanedionato) (25 ppm by weight of metallic cobalt based on the resultant resin).

After substituting in the inside of the system with nitrogen, the temperature was elevated to 140° C. and acetylation was conducted for 2 hours. The acetylation rate of the content upon completion of the acetylation was 99.8%. then, the temperature was elevated at about 0.6 to 1° C. per minute, the temperature was elevated up to 360° C. while distillating and removing by-produced acetic acid and then pressure was lowered therefrom down to 10 Torr (1334 Pa) over 15 min and polycondensation was conducted while distilling off excess acetic acid or low boiling compounds. It took 0.7 min till the torque of the stirrer reached a predetermined value (1.7 kg·cm) and, subsequently, nitrogen was introduced and the polymer was discharged from the lower portion of the polymerization vessel.

Deposition of the sublimation products in the lower portion of the column after the completion of the polymerization was to such an extent as depositing thinly on the wall surface. The resultant polymer (prepolymer) had a melting viscosity at 380° C. of 6.8 Pa·s and a melting point of 350° C.

The prepolymer was applied with a heat treatment at 320° C. for 7 hours in a nitrogen gas stream to obtain a polymer having a melting viscosity at 380° C. of 150.1 Pa·s and a melting point of 355° C.

Example 2

A polymer was obtained in the same manner as in Example 1 except for changing the amount of potassium acetate to 22.5 mg (30 ppm by weight of metallic potassium based on the resultant resin).

Example 3

A polymer was obtained in the same manner as in Example 1 except for changing the amount of cobalt (III) tris(2,4-pentanedionate) to 67.5 mg (37 ppm by weight of metallic cobalt based on the resultant resin).

Comparative Example 1

A polymer was obtained in the same manner as in Example 1 except for using 45.0 mg of cobalt acetate (II) tetra hydrate (35 ppm by weight of metallic cobalt based on the resultant resin) instead of cobalt (III) tris(2,4-pentanedionate). After the completion of polymerization, sublimation products in the lower portion of the column closed about 30% of the column flow channel to suggest a possibility of influence on the progress of the reaction upon conducting continuous operation.

Comparative Example 2

A polymer was obtained in the same manner as in Example 1 except for using 90.0 mg of potassium acetate (120 ppm by weight of metallic potassium based on the resultant resin) without using cobalt (III) tris(2,4-pentanedionate). After the completion of polymerization, sublimation products in the lower portion of the column closed about 80% or more of the column flow channel to suggest a possibility of causing significant troubles upon conducting continuous operation.

Comparative Example 3

A polymer was obtained in the same manner as in Example 1 except for not using potassium acetate.

Comparative Example 4

A polymer was obtained in the same manner as in Comparative Example 1 except for not using potassium acetate.

The results are shown collectively in Table 1.

TABLE 1

|  | Potassium compound catalyst | Cobalt compound catalyst | Acetylation ratio (%) | Time to reach predetermined torque (min) | Sublimation product deposition state | Melting viscosity (Pa · s) | Melting viscosity after solid phase polymerization (Pa · s) |
|---|---|---|---|---|---|---|---|
| Example 1 | Potassium acetate 60 ppm K | Co(acac)3* 25 ppm Co | 99.8 | 0.7 | A | 6.8 | 150.1 |
| Example 2 | Potassium acetate 30 ppm K | Co(acac)3* 25 ppm Co | 99.4 | 0.8 | A | 6.3 | 142.5 |
| Example 3 | Potassium acetate 60 ppm K | Co(acac)3* 37 ppm Co | 99.5 | 1.1 | A | 7.0 | 152.4 |
| Comp. Example 1 | Potassium acetate 60 ppm K | Cobalt acetate (II) 35 ppm Co | 99.1 | 2.2 | B | 7.1 | 135.2 |
| Comp. Example 2 | Potassium acetate 120 ppm K | — | 98.4 | 7.0 | C | 5.8 | 77.0 |
| Comp. Example 3 | — | Co(acac)3* 25 ppm Co | 99.2 | 7.7 | B | 7.7 | 150.7 |
| Comp. Example 4 | — | Colbalt acetate (II) 35 ppm Co | 98.6 | 6.2 | B | 6.6 | 97.8 |

Polymer composition: 2-hydroxy-6-naphthoic acid/4-hydroxy benzoic acid/terephthalic acid/4,4'-dihydroxybiphenyl = 48/2/25/25
*Co(acac)3: Cobalt (III)tris(2,4-pentanedionate)

What is claimed is:

1. A process for preparing a liquid crystalline polymer including a constituent unit derived from 4-hydroxy-benzoic acid in an amount of 8 mol % or less, comprising polymerizing monomers in the presence of a catalytic amount of a catalyst comprising a potassium compound and a trivalent cobalt compound in combination.

2. The process as defined in claim 1, wherein the liquid crystalline polymer contains constituent units represented by the following formulae (I), (II), (III) and (IV), in which the amount of the constituent unit (I) is 40 to 75 mol %; that of (II), 8.5 to 30 mol %; that of (III), 8.5 to 30 mol %; and that of (IV), 0.1 to 8 mol % based on the entire constituent units:

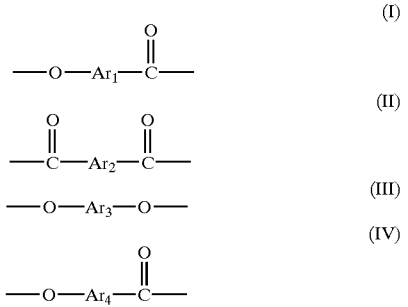

(where $Ar_1$ represents 2,6-naphthalene, $Ar_2$ represents at least one selected from the group consisting of 1,2-phenylene, 1,3-phenylene and 1,4-phenylene, $Ar_3$ represents at least residue selected from the group consisting of 1,3-phenylene, 1,4-phenylene or a residue of compounds including two or more phenylene groups connected with each other at para-positions and $Ar_4$ represents 1,4-phenylene).

3. The process as defined in claim 2, wherein the potassium compound is an aliphatic and/or aromatic carboxylate.

4. The process as defined in claim 2, wherein the potassium compound is potassium acetate.

5. The process as defined in claim 2, wherein the trivalent cobalt compound is selected from the group consisting of carboxylates, oxides, hydroxides, carbonates, complex salts and a mixture thereof.

6. The process as defined in claim 2, wherein the trivalent cobalt compound is tris (2,4-pentadionate) cobalt (III).

7. The process as defined in claim 1, wherein the polymerization is conducted by charging the entire starting monomers, an acylating agent and the catalyst simultaneously into a reaction system to effect melt polycondensation.

8. The process as defined in claim 7, which further comprising a solid phase polymerization step to increase a polymerization degree of a prepolymer obtained by the melt polycondensation.

9. The process as defined in claim 1, wherein the potassium compound is an aliphatic and/or aromatic carboxylate.

10. The process as defined in claim 1, wherein the potassium compound is potassium acetate.

11. The process as defined in claim 1, wherein the trivalent cobalt compound is selected from the group consisting of carboxylates, oxides, hydroxides, carbonates, complex salts and a mixture thereof.

12. The process as defined in claim 1, wherein the trivalent cobalt compound is tris (2, 4-pentadionate) cobalt (III).

* * * * *